FIG. I

June 30, 1959  L. SHAKESBY  2,892,490
ADJUSTMENT MEANS FOR SPOKE TIGHTENING TOOL
Filed June 17, 1957  2 Sheets-Sheet 2

INVENTOR
LEONARD SHAKESBY
BY Featherstonhaugh & Co.
ATTORNEYS

United States Patent Office 2,892,490
Patented June 30, 1959

2,892,490

ADJUSTMENT MEANS FOR SPOKE TIGHTENING TOOL

Leonard Shakesby, Toronto, Ontario, Canada, assignor to Canada Cycle and Motor Company Limited, Toronto, Ontario, Canada Application June 17, 1957, Serial No. 665,999

4 Claims. (Cl. 157—1.5)

This invention relates to spoke tightening machines.

The general as well as the specific embodiment of the invention will be described with reference to the drawings in which.

Figure 1:
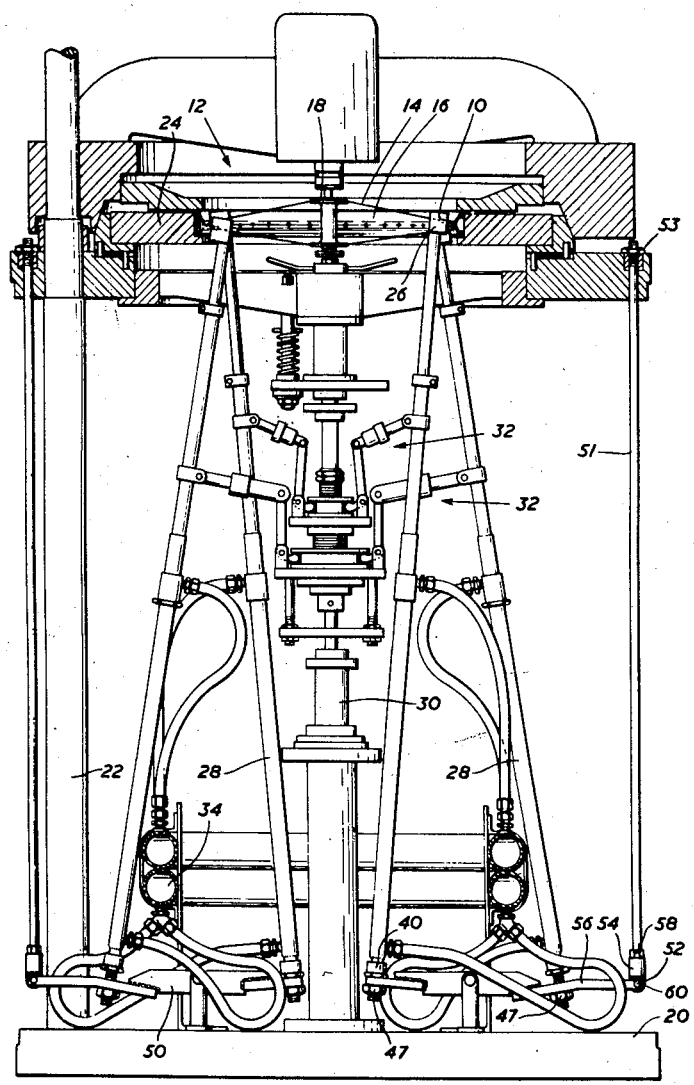
Figure 1 is a general illustration of a spoke tightening machine.
Figure 2:
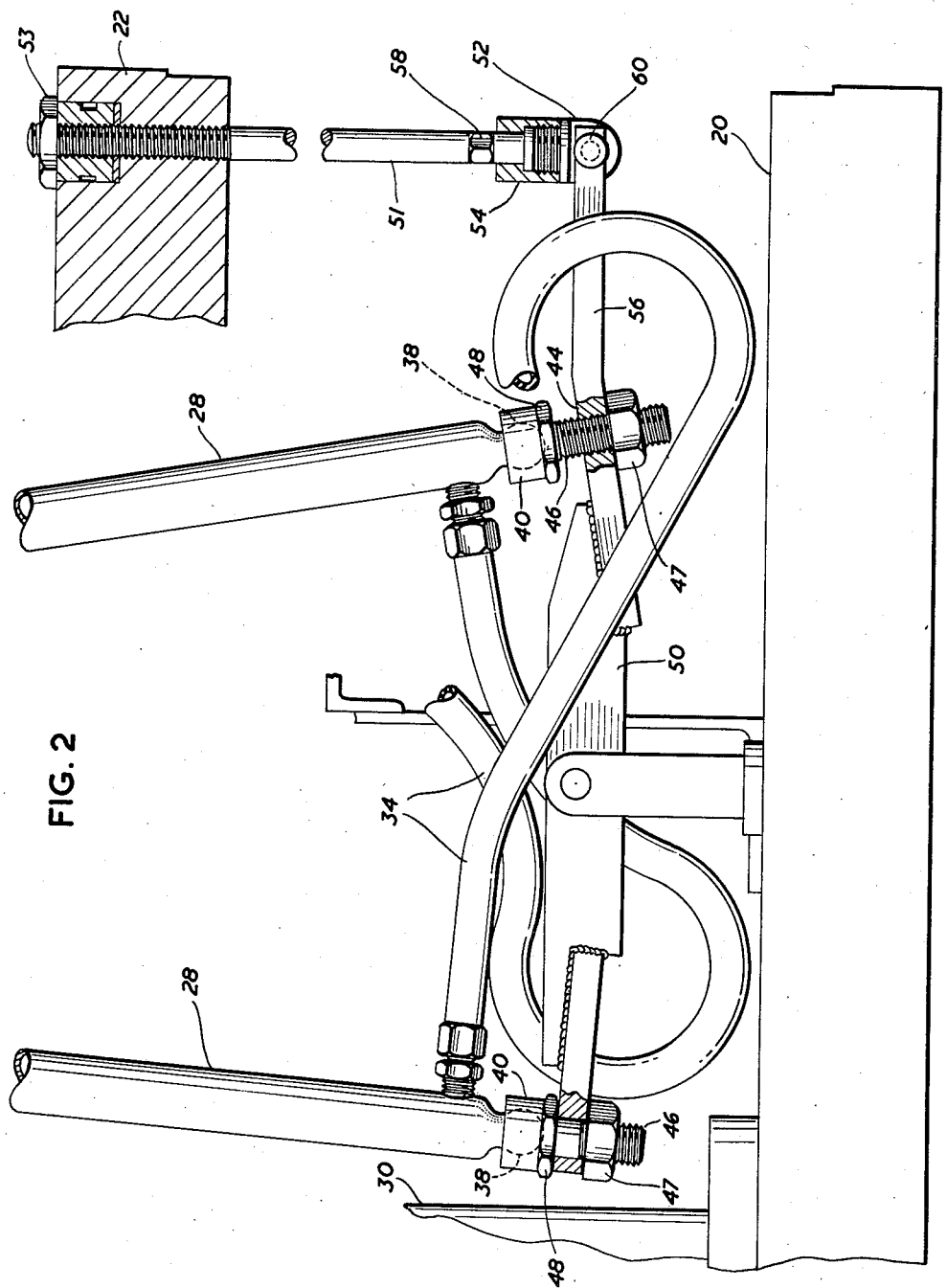
Figure 2 is an enlargement of the inventive features thereof.

Figure 1 illustrates the main components of a spoke tightening machine for the tightening of spoke nipples 10 of bicycle wheels 12, the wheels 12 being of the type wherein the spokes 14 extend from the wheel rim 16 to the ends of the wheel hub 18 and wherein alternate spokes 14 extend to opposite sides of said hub. This machine is provided with a base 20, and a frame 22 mounted thereon. The frame 22 is provided with means 24 for supporting a wheel 12 in a position spaced from said base. The machine is provided with a number of spoke tightening heads 26 corresponding to the number of spokes 14, each head 26 being adapted to contact one spoke nipple. A tubular member 28 supports each head 26, the tubular members 28 each being preferably hydraulically operated and each extending toward said base and generally perpendicularly to the spoke 14 to which they correspond. Thus it will be seen that alternate tubular members extend from the wheel rim toward and away from the axis of said rim, in their extent away from it. The tubular members 28 are supported on said base in a manner to be hereinafter described.

A central standard 30 mounts linkage 32 which connect to the tubular members 28 and are operated by suitable operating means: (a) to move the members 28 radially outwardly so that the heads 26 may respectively contact the nipples 10 to effect the tightening thereof; and (b) to move the members 28 radially inwardly after the tightening of nipples 10 has been completed. The head is fitted with suitable means for making operative contact with the spoke nipple and the tubular member carries a gear rack (not shown) which may be reciprocated by hydraulic means 34, the gear rack operating gear means in head 26 to rotate the spoke nipple 10. The machine which merely forms the structural background for this invention, operates as follows:

A wheel is placed in position on the frame and the tubular members are located at their radially inner positions so that heads 26 contact the spokes 14 instead of the spoke nipples 10. On actuation the linkages 32 are actuated to move the heads 26 outwardly into operative contact with the spoke nipples 10 and on actuation the gear rack is actuated by hydraulic means 34 to cause rotation of the nipple 10. When the nipple has been tightened the linkages 32 move the heads 26 inwardly out of contact with the nipples.

It will be seen that the height of the heads 26 is critical for proper operative connection with the nipple 10, and hence the height of the mounting of the tubular members 28 is critical. Moreover due to the slight misalignments of the spokes 14 or of the tubular member 28 the mounting of the tubular members 28 must be axially adjustable to allow the spokes 14 and members 28 to adjust one to the other before and during the rotation of the spoke nipple 10 by means of the heads 26.

It is therefore an object of this invention to provide a means for easily adjusting the heights of tubular members such as members 28. It is a further object of this invention to provide a means for mounting members 28 which allows the tubular members to be axially adjustable with respect to the base 20.

In accord with the invention, tubular members 28 are connected with the base by a universal joint. The universal joint preferably comprises a ball 38 at the lower extremity of each tubular member 28 fitted in a cooperating socket member 40, the socket being mounted on base 20. It will thus be seen that the universal mounting allows adjustment of the attitude of tubular member 28 relative to the base to conform to the requirements of alignment of head 26 with spoke 14 and allows for rotation of the member 28 relative to the base to conform to such requirements.

In accord with the invention means are provided connecting each said tubular member to said base comprising a member rotatably connected to each said tubular member, a member mounted on said base adapted to support each said rotatably mounted member and through it each said tubular member, said rotatable member being threadedly connected to said base-mounted member. Preferably the rotatably connected member is socket member 40. A rocker arm 50 is the preferred member mounted on said base and is provided with a threaded aperture 44 into which a threaded shank 46 extends downwardly from socket member 40. The socket member is provided with flats 48 for the application of a wrench, whereby its height may be adjusted with respect to the base 20.

A head 26 is adapted to contact each spoke nipple 10 and tubular members 28 each extend toward base 20 generally perpendicularly to the spoke 14 to which they correspond. The spokes 14 extend alternately to opposite sides of the hub, hence the lower extremities of said tubular members 28 define inner and outer concentric circles adjacent said base 20. Since there are a large number of such tubular members 28 it is relatively difficult to adjust the height of those tubular members 28 which are located on the inner circle.

It is therefore the object of this invention to provide a mounting for the lower extremities of tubular members 28 which will allow easy adjustment of the inwardly extending tubular members 28 by means which are easy to get at.

It will be noted that since alternate spokes 14 go to opposite sides of the hub, that the lower extremities of alternate tubular members 28 will form the inner and outer circles adjacent the base 20 and the lower extremities of said tubular members 28 may be divided into pairs of adjacent lower extremities each pair comprising an extremity from the inner and an extremity from the outer circle.

In accord with the invention therefore, a rocker arm 50 is provided corresponding to each said pair, said arm 50 being horizontally pivotally mounted on base 20 and extending on each side of the pivot point to support an inner and an outer lower extremity of two tubular members 28 respectively. Means are provided for varying the attitude of each rocker arm 50 relative to the base 20 to control the height of the inner extremity of a tubular member 28. The means for varying the attitude of rocker arm 50 preferably comprises a rod 51 extending downwardly from the frame 22 and threadedly mounted to be connected to a junction member 52 by a swivel joint 54. Junction member 52 is horizontally pivotally connected as at 60 to an extension 56 of rocker 50. Rod 51 is provided with a nut 58 which may be rotated to vary the distance between frame 22 and the pivotal connection 60 to vary the attitude of the rocker 50 and hence the height of (in particular) each inner tubular member 28. The lower extremity of each tubular member 28 is preferably provided with a ball 38, while a cooperating socket member 40 is provided with shank 46 threaded into rocker 50 as already described. Flats 48 allow adjustment of the height of socket member 40 and hence of the tubular member 28 mounted thereon. In practice the rod 51 is adjusted for each rocker arm 50 to correctly set the height of the inner tubular member 28 mounted on this arm. A lock nut 53 threaded on rod 51 is then turned against frame 22 to ensure the member being adjusted in this way, the corresponding outer tubular member 28 is then adjusted by rotation of socket member 40 to vary the height thereof relative to the rocker arm 50 which has already been set to fix the height of the inner tubular member 28. Each shank 46 for socket member 40 is preferably provided with a lock nut 47 to fix it in position when the heights have been correctly adjusted.

It will be seen that by this method both the inner and outer tubular members may be easily adjusted from outside the circles of tubular members 28. It will also be seen that the height of the tubular members 28 may be easily adjusted relative to rocker arm 50. Moreover the ball and socket joint 38—40 allows each tubular member to adapt itself to the requirements of the relative orientation of the head 26 and spoke 14.

What I claim as my invention is:

1. In a spoke tightening machine having a base, a frame mounted thereon adapted to hold the wheel of a bicycle whose spoke nipples are to be tightened, a head adapted to contact each spoke nipple, a tubular member for supporting each said head, means operating on said tubular member for moving said member to bring said head into operative contact with said spoke nipples, and means mounted in said head and operable through said tubular member for rotating each said nipple; means connecting each said tubular member to said base comprising a member universally connected to said tubular member, a member mounted on said base, adapted to support said universally connected member and through it, said tubular member, said member being threadedly connected to said universally connected member and relatively adjustable with respect thereto.

2. In a spoke tightening machine having a base, a frame mounted thereon adapted to hold the wheel of a bicycle whose spoke nipples are to be tightened, a head adapted to contact each spoke nipple, a tubular member for supporting each said head, means operating on said tubular member for moving said member to bring said head into operative contact with said spoke nipples, and means mounted in said head and operable through said tubular member for rotating each said nipple; means connecting each said tubular member to said base including a member threadedly connected to said base and adjustable with respect thereto, a ball and socket joint, said ball being connected to one of said threadedly connected member or said tubular member and said socket being connected to the other of said tubular member or said threadedly connected member.

3. In a spoke tightening machine for tightening the spoke nipples of bicycle wheels, such wheels being of the type wherein spokes extend from the rim to the ends of the wheel hub and wherein alternate spokes extend to opposite sides of said hub, said machine having a base, a frame mounted thereon adapted to hold such a bicycle wheel in a position spaced from said base and roughly parallel thereto, a head adapted to contact each spoke nipple, a tubular member for supporting each said head, said tubular members each extending generally perpendicularly to the spoke to which they correspond toward said base whereby alternate tubular members extend inwardly and outwardly relative to, and away from, the wheel rim, the extremities of the tubular members remote from the rim roughly defining two concentric circles, adjacent said base; a series of rocker arms mounted on said base adapted to support at one end, the extremity of an inwardly extending tubular member and at the other end the extremity of an adjacent outwardly extending tubular member, means for controlling the attitude of said rocker arm to control the height of one of said tubular members and individual means connecting said other tubular member and said other end of said rocker arm to control the height of said other tubular member; and means for moving said heads to contact said spoke nipples and for rotating said spoke nipples.

4. In a spoke tightening machine as claimed in claim 3 wherein said means for controlling the attitude of said rocker arm comprises a rod slidably connected to said frame longitudinally extending to connect to one end of each said rocker arm and longitudinally adjustable relative to said frame to vary the attitude of said rocker arm.

References Cited in the file of this patent
UNITED STATES PATENTS

| | | |
|---|---|---|
| 1,876,356 | Sneed | Sept. 6, 1932 |
| 2,536,317 | Shakesby | Jan. 7, 1951 |
| 2,607,402 | Meydrech | Aug. 19, 1952 |